US012719723B2

(12) United States Patent
Chung et al.

(10) Patent No.: US 12,719,723 B2
(45) Date of Patent: Aug. 25, 2026

(54) PULSE AMPLITUDE MODULATION (PAM) SLICER INCLUDING THRESHOLD CALIBRATION CIRCUIT

(71) Applicant: QUALCOMM Incorporated, San Diego, CA (US)

(72) Inventors: Younwoong Chung, San Diego, CA (US); Yu Song, San Diego, CA (US); Chia Heng Chang, San Diego, CA (US); Alan Daniel, Morehead City, NC (US); Madjid Hafizi, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 75 days.

(21) Appl. No.: 18/975,736

(22) Filed: Dec. 10, 2024

(65) Prior Publication Data

US 2026/0163769 A1 Jun. 11, 2026

(51) Int. Cl.

*H04L 25/49* (2006.01)
*H04L 25/02* (2006.01)

(52) U.S. Cl.

CPC ...... *H04L 25/4917* (2013.01); *H04L 25/0204* (2013.01)

(58) Field of Classification Search

CPC ........................ H04L 25/4917; H04L 25/0204
See application file for complete search history.

(56) References Cited

U.S. PATENT DOCUMENTS

| | | | | |
|---|---|---|---|---|
| 9,237,047 | B1 * | 1/2016 | Zhang | H04L 27/06 |
| 10,044,539 | B2 * | 8/2018 | Wu | H04L 27/2275 |
| 2004/0141567 | A1 * | 7/2004 | Yang | H04L 25/069 375/353 |
| 2017/0171004 | A1 | 6/2017 | Wu et al. | |
| 2020/0125505 | A1 * | 4/2020 | Brox | G11C 7/1084 |
| 2022/0329404 | A1 * | 10/2022 | Misischi | H04L 25/4917 |

OTHER PUBLICATIONS

International Search Report and Written Opinion—PCT/US2025/057361—ISA/EPO—Mar. 23, 2026.

* cited by examiner

*Primary Examiner* — David S Huang
(74) *Attorney, Agent, or Firm* — Loza & Loza, LLP

(57) ABSTRACT

A method of calibrating a first threshold voltage of a first pulse amplitude modulation (PAM) slicer and a second threshold voltage of a second PAM slicer. The method includes: calibrating the first threshold voltage of the first PAM slicer based on a non-return-to-zero (NRZ) signal and a PAM signal; and calibrating the second threshold voltage of the second PAM slicer based on the PAM signal and the calibrated first threshold voltage.

20 Claims, 6 Drawing Sheets

PULSE AMPLITUDE MODULATION (PAM) SLICER INCLUDING THRESHOLD CALIBRATION CIRCUIT

FIELD

This disclosure relates generally to pulse amplitude modulation (PAM) signaling, and in particular, to a PAM slicer including a threshold calibration circuit.

BACKGROUND

A pulse amplitude modulation (PAM)3 signal includes three (3) logic voltage levels: 1, 0, and −1. The PAM3 signal includes an upper eye between the 1-logic voltage level and the 0-logic voltage level, and a lower eye between the 0-logic voltage level and the −1-logic voltage level. A PAM3 data detection circuit includes an upper slicer configured to generate upper data from the PAM3 signal based on an upper threshold voltage, and a lower slicer configured to generate lower data based on a lower threshold voltage.

The upper voltage level should be set halfway between the 1-logic voltage level and the 0-logic voltage level. The lower voltage level should be set halfway between the 0-logic voltage level and the −1-logic voltage level. However, the voltage levels of the PAM3 signal may vary with process, voltage, and temperature (PVT). Thus, a calibration of the upper and lower threshold voltages may be needed to ensure accurate detection of the upper and lower data.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a set of N pulse amplitude modulation (PAM) slicers, wherein N is an integer; a calibration PAM slicer; a threshold voltage source coupled to the set of N PAM slicers and the calibration PAM slicer; a calibration signal source coupled to the set of N PAM slicers and the calibration PAM slicer; and a calibration control circuit coupled to the set of N PAM slicers, the calibration PAM slicer, the threshold voltage source, and the calibration signal source.

Another aspect of the disclosure relates to a method calibrating at least a first calibrated threshold voltage of a first PAM slicer. The method including: providing a non-return-to-zero (NRZ) signal to the first PAM slicer and a calibration PAM slicer; providing a first fixed threshold voltage to the first PAM slicer; providing a first sweeping threshold voltage to the calibration PAM slicer; comparing data generated by the first PAM slicer with data generated by the calibration PAM slicer, wherein the data generated by the first PAM slicer is based on the NRZ signal and the first fixed threshold voltage, and wherein the data generated by the calibration PAM slicer is based on the NRZ signal and the first sweeping threshold voltage; and providing a second fixed threshold voltage to the first PAM slicer based on the comparison of the data generated by the first PAM slicer with the data generated by the calibration PAM slicer.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" means that the associated parameter may not be exact as indicated but accounts for some variation due to specified tolerances.

Figure 1:
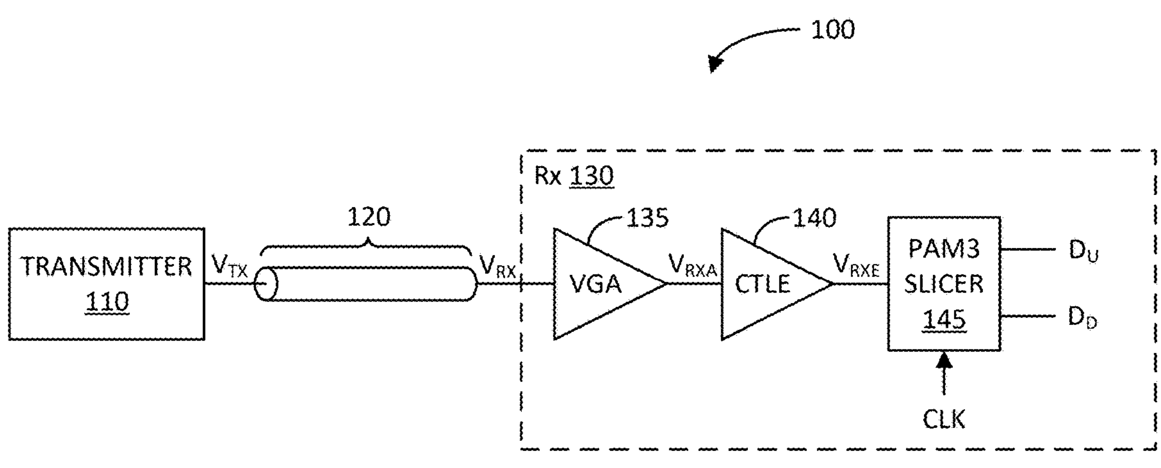
FIG. 1 illustrates a block diagram of an example serializer/deserializer (SERDES) data communication system in accordance with an aspect of the disclosure.

FIG. 1 illustrates a block diagram of an example serializer/deserializer (SERDES) data communication system 100 in accordance with an aspect of the disclosure. The SERDES data communication system 100 includes a transmitter 110 coupled to a receiver 130 via a communication channel 120.

The receiver 130, in turn, includes a variable gain amplifier (VGA) 135, a continuous time linear equalizer (CTLE) 140, and a pulse amplitude modulation (PAM)3 slicer 145.

The transmitter 110 is configured to generate a transmit data signal $V_{TX}$ for transmission to the receiver 130 via the communication channel 120. The transmit data signal $V_{TX}$ may be a pulse amplitude modulation (PAM) 3 signal (or other PAM signal, such as PAM4, PAM5, etc.). The communication channel 120 may support single-ended PAM signaling, differential PAM signaling, or pseudo-differential PAM signaling. The transmit data signal $V_{TX}$ propagates through the communication channel 120, where it undergoes channel effects (e.g., reducing its high frequency content) to produce a receive signal $V_{RX}$ at an input of the receiver 130.

With regard to the receiver 130, the VGA 135 is configured to amplify the received signal $V_{RX}$ to generate an amplified received signal $V_{RXA}$. The CTLE 140 is configured to equalize the amplified received signal $V_{RXA}$ to generate an equalized received signal $V_{RXE}$, where the equalization compensates for the channel effects as a result of the transmit data signal $V_{TX}$ propagating through the communication channel 120. The PAM3 slicer 145 is configured to generate data $D_U$ and $D_D$ based on a clock signal CLK by sequentially comparing the equalized received signal $V_{RXE}$ to upper and lower threshold voltages, respectively.

Figure 2:
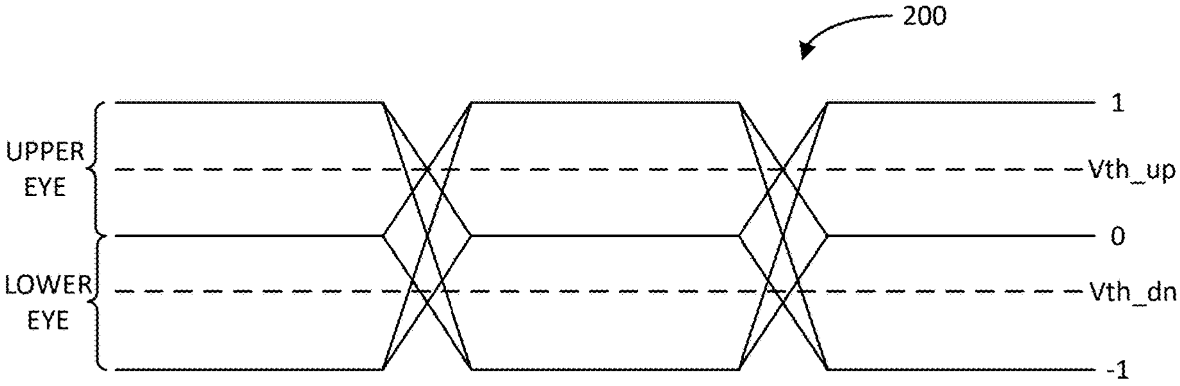
FIG. 2 illustrates a signal diagram of an example pulse amplitude modulation (PAM) signal in accordance with another aspect of the disclosure.

FIG. 2 illustrates a signal diagram of an example pulse amplitude modulation (PAM) signal 200 in accordance with another aspect of the disclosure. In this example, the PAM signal 200 is a PAM3 signal, which includes three (3) logic voltage levels: a positive (1) logic voltage level, a zero (0) logic voltage level, and a negative (−1) logic voltage level. Accordingly, it is often termed as a ternary signal. Accordingly, the PAM3 signal 200 includes an upper eye between the 1-logic voltage level and the 0-logic voltage level, and a lower eye between the 0-logic voltage level and the −1-logic voltage level.

The PAM3 slicer 145 compares the PAM3 signal 200 to an upper threshold voltage Vth_up to generate the upper data $D_U$, and compares the PAM3 signal 200 to a lower threshold voltage Vth_dn to generate the lower data $D_D$. The upper threshold voltage Vth_up may be situated halfway between the 1-logic voltage level and the 0-logic voltage level. Similarly, the lower threshold voltage Vth_dn may be situated halfway between the 0-logic voltage level and the −1-logic voltage level.

Thus, if the PAM3 signal 200 is around the 1-logic voltage level at a clocking edge of the clock signal CLK, the PAM3 slicer 145 assigns the data $D_U$ as a logic one (1) because it is greater than the upper threshold voltage Vth_up, and the data $D_D$ as a logic zero (0) because it is greater than the lower threshold voltage Vth_dn (e.g., $D_U$=1, $D_D$=0). If the PAM3 signal 200 is around the 0-logic voltage level at a clocking edge of the clock signal CLK, the PAM3 slicer 145 assigns the data $D_U$ as a logic zero (0) because it is less than the upper threshold voltage Vth_up, and the data $D_D$ as a logic zero (0) because it is greater than the lower threshold voltage Vth_dn (e.g., $D_U$=0, $D_D$=0). If the PAM3 signal 200 is around the −1-logic voltage level at a clocking edge of the clock signal CLK, the PAM3 slicer 145 assigns the data $D_U$ as a logic zero (0) because it is less than the upper threshold voltage Vth_up, and the data $D_D$ as a logic negative one (−1) because it is less than the lower threshold voltage Vth_dn (e.g., $D_U$=0, $D_D$=−1).

Figure 3:
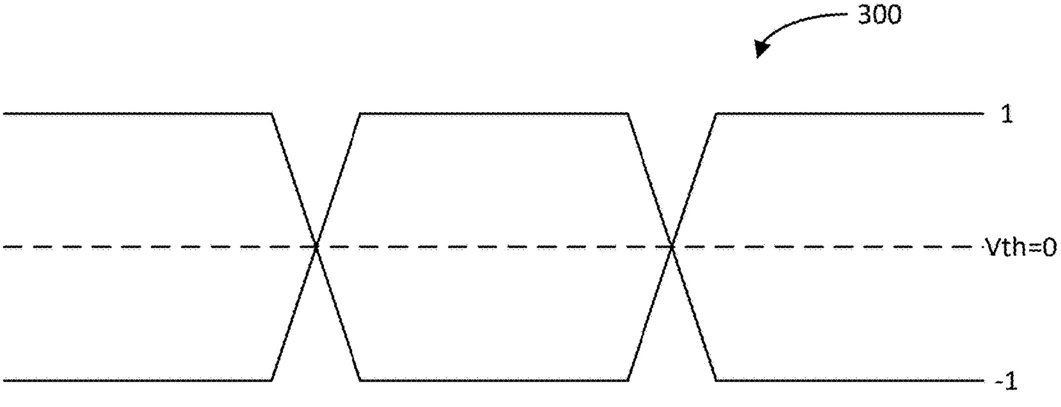
FIG. 3 illustrates a signal diagram of an example non-return-to-zero (NRZ) signal in accordance with another aspect of the disclosure.

FIG. 3 illustrates a signal diagram of an example non-return-to-zero (NRZ) signal 300 in accordance with another aspect of the disclosure. As discussed further herein, the NRZ signal 300 may be used to calibrate the upper and lower threshold voltages Vth_up and Vth_dn of the PAM3 slicer 145. The NRZ signal 300 includes two logic voltage levels 1 and −1 above and below a zero (0) voltage level, respectively.

Thus, if the NRZ signal 300 is around the 1-logic voltage level at a clocking edge of the clock signal CLK, the PAM3 slicer 145 assigns the data $D_U$ as a logic one (1) because it is greater than the upper threshold voltage Vth_up, and the data $D_D$ as a logic zero (0) because it is greater the lower threshold voltage Vth_dn (e.g., $D_U$=1, $D_D$=0). If the NRZ signal 300 is around the −1-logic voltage level at a clocking edge of the clock signal CLK, the PAM3 slicer 145 assigns the data $D_U$ as a logic zero (0) because it is less than the upper threshold voltage Vth_up, and the data $D_D$ as a logic negative one (−1) because it is less the lower threshold voltage Vth_dn (e.g., $D_U$=0, $D_D$=−1).

Figure 4A:
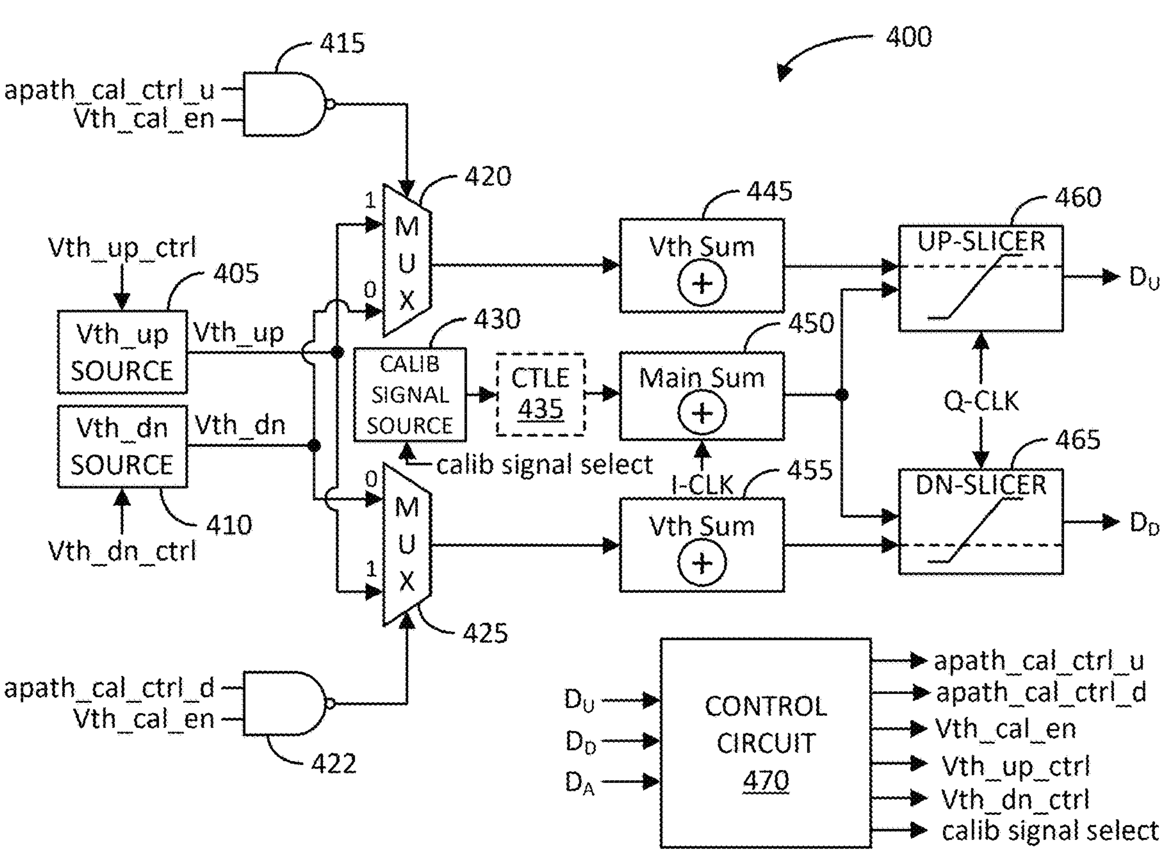
FIG. 4A illustrates a block diagram of an example pulse modulation amplitude (PAM)3 slicer circuit in accordance with another aspect of the disclosure.

FIG. 4A illustrates a block diagram of an example pulse modulation amplitude (PAM)3 slicer circuit 400 in accordance with another aspect of the disclosure. The PAM3 slicer circuit 400 may be part of an example implementation of the PAM3 slicer 145 previously discussed. As the voltage levels of the PAM3 signal 200 may vary due to a number of conditions (e.g., process, voltage, temperature (PVT)), the upper threshold voltage Vth_up and the lower threshold voltage Vth_dn should be calibrated to improve or optimize the detection of data in the PAM3 signal.

In particular, the PAM3 slicer 400 includes an upper threshold voltage source 405 and a lower threshold voltage source 410. The upper threshold voltage source 405 is configured to generate an upper threshold voltage Vth_up based on an upper threshold voltage control signal Vth_up_ctrl (e.g., a value indicated by <7:0>). The lower threshold voltage source 410 is configured to generate a lower threshold voltage Vth_dn based on a lower threshold voltage control signal Vth_dn_ctrl (e.g., a value indicated by <7:0>). The PAM3 slicer circuit 400 includes a first multiplexer 420 including a first "1" input coupled to an output of the upper threshold voltage source 405 to receive the upper threshold voltage Vth_up, and a second "0" input coupled to an output of the lower threshold voltage source 410 to receive the lower threshold voltage Vth_dn.

Additionally, the PAM3 slicer circuit 400 includes a first NAND gate 415 including a first input configured to receive an upper threshold calibration control signal apath_cal_ctrl_u, a second input configured to receive a calibration enable signal Vth_cal_en, and an output coupled to a select input of the first multiplexer 420. Further, the PAM3 slicer circuit 400 includes a second NAND gate 422 including a first input configured to receive a lower threshold calibration control signal apath_cal_ctrl_d, a second input configured to receive the calibration enable signal Vth_cal_en, and an output coupled to a select input of the second multiplexer 425.

The PAM3 slicer circuit 400 includes a first threshold voltage (Vth) summer 445 including an input coupled to an output of the first multiplexer 420, and a second threshold voltage (Vth) summer 455 including an input coupled to an output of the second multiplexer 425. The PAM3 slicer circuit 400 further includes a calibration signal source 430 configured to generate a calibration PAM3 signal $S_{PAM3}$ or a calibration NRZ $S_{NRZ}$ signal based on a calibration signal select signal. The PAM3 signal and the NRZ signal may each be transmitted with pre-defined data or "golden data." The calibration signal source 430 includes an output coupled to an input of a continuous time linear equalizer (CTLE)

435, which may coincide with the CTLE 140 of SERDES data communication system 100.

The PAM3 slicer circuit 400 further includes an upper (UP) slicer 460 and a lower (DN) slicer 465. The upper slicer 460 includes a threshold voltage control input coupled to an output of the first threshold voltage (Vth) summer 445. The lower slicer 460 includes a threshold voltage control input coupled to an output of the second threshold voltage (Vth) summer 455. The upper and lower slicers 460 and 465 include clock inputs configured to receive a quadrature-phase clock signal Q-CLK.

The PAM3 slicer circuit 400 further includes a main summer 450 including an input coupled to an output of the CTLE 435, and an output coupled to signal inputs of the upper slicer 460 and the lower slicer 465, respectively. The main summer 450 includes a clock input configured to receive an in-phase clock signal (I-CLK) for providing the calibration data signal to the upper and lower slicers 460 and 465. The upper and lower slicers 460 and 465 are configured to generate upper and lower data $D_U$ and $D_D$ based on the calibration data signal received from the main summer 450 and the upper and lower threshold voltages Vth_up and Vth_dn received from outputs of the first and second multiplexers 420 and 425 via the first and second threshold voltage summers 445 and 455, respectively.

Additionally, the PAM3 slicer circuit 400 includes a calibration control circuit 470 configured to receive the upper and lower data $D_U$ and $D_D$ from the upper and lower slicers 460 and 465, and data $D_A$ from a calibration PAM slicer 495 discussed further herein. The calibration control circuit 470 is further configured to generate the control signals apath_cal_ctrl_u, apath_cal_ctrl_d, Vth_cal_en, Vth_up_ctrl, Vth_dn_ctrl, and calibration signal select.

Figure 4B:
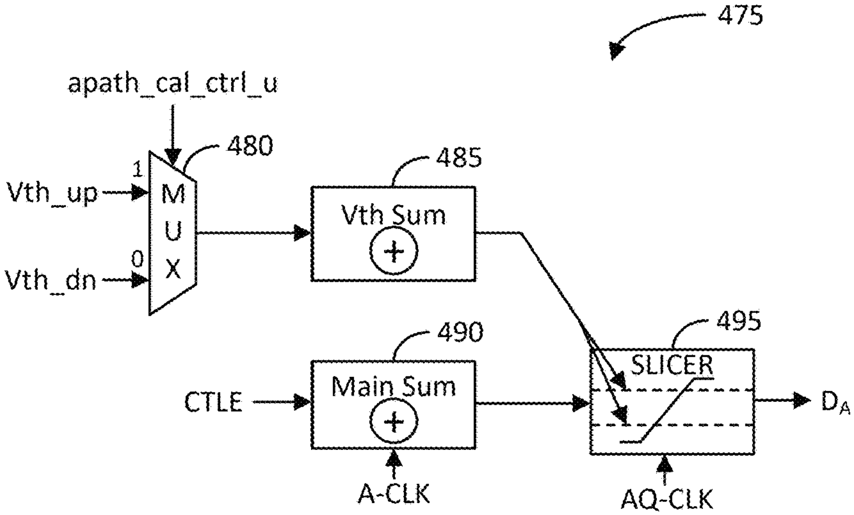
FIG. 4B illustrates a block diagram of an example pulse modulation amplitude (PAM) 3 calibration (auxiliary) slicer circuit in accordance with another aspect of the disclosure.

FIG. 4B illustrates a block diagram of an example PAM3 calibration (auxiliary) slicer circuit 475 in accordance with another aspect of the disclosure. The PAM3 calibration slicer circuit 475 may also be a part of the PAM3 slicer 145 of SERDES data communication system 100. The PAM3 calibration slicer circuit 475 includes a multiplexer 480, a threshold voltage summer 485, a main summer 490, and a calibration PAM slicer 495.

The multiplexer 480 includes a first "1" input coupled to the output of the upper threshold voltage source 405 to receive the upper threshold voltage Vth_up, a second "0" input coupled to the output of the lower threshold voltage source 410 to receive the lower threshold voltage Vth_dn, a select input configured to receive the upper threshold calibration control signal apath_cal_ctrl_u from the calibration control circuit 470, and an output coupled to an input of the threshold voltage (Vth) summer 485. The threshold voltage (Vth) summer 485 includes an output coupled to the upper and lower threshold voltage control inputs of the calibration PAM slicer 495.

The main summer 490 includes an input coupled to the output of the CTLE 435 to receive the calibration data signal. The main summer 490 includes a clock input configured to receive an in-phase calibration (auxiliary) clock signal A-CLK. The main summer 490 further includes an output coupled to a signal input of the calibration PAM slicer 495 for providing thereto the calibration data signal. The calibration PAM slicer 495 includes a clock input configured to receive a quadrature-phase calibration (auxiliary)y clock signal AQ-CLK, and an output configured to generate the calibration data signal $D_A$. The following describes an example method of calibrating the upper and lower voltage thresholds Vth_up and Vth_dn of the PAM3 slicer circuit 400.

Figure 5A:
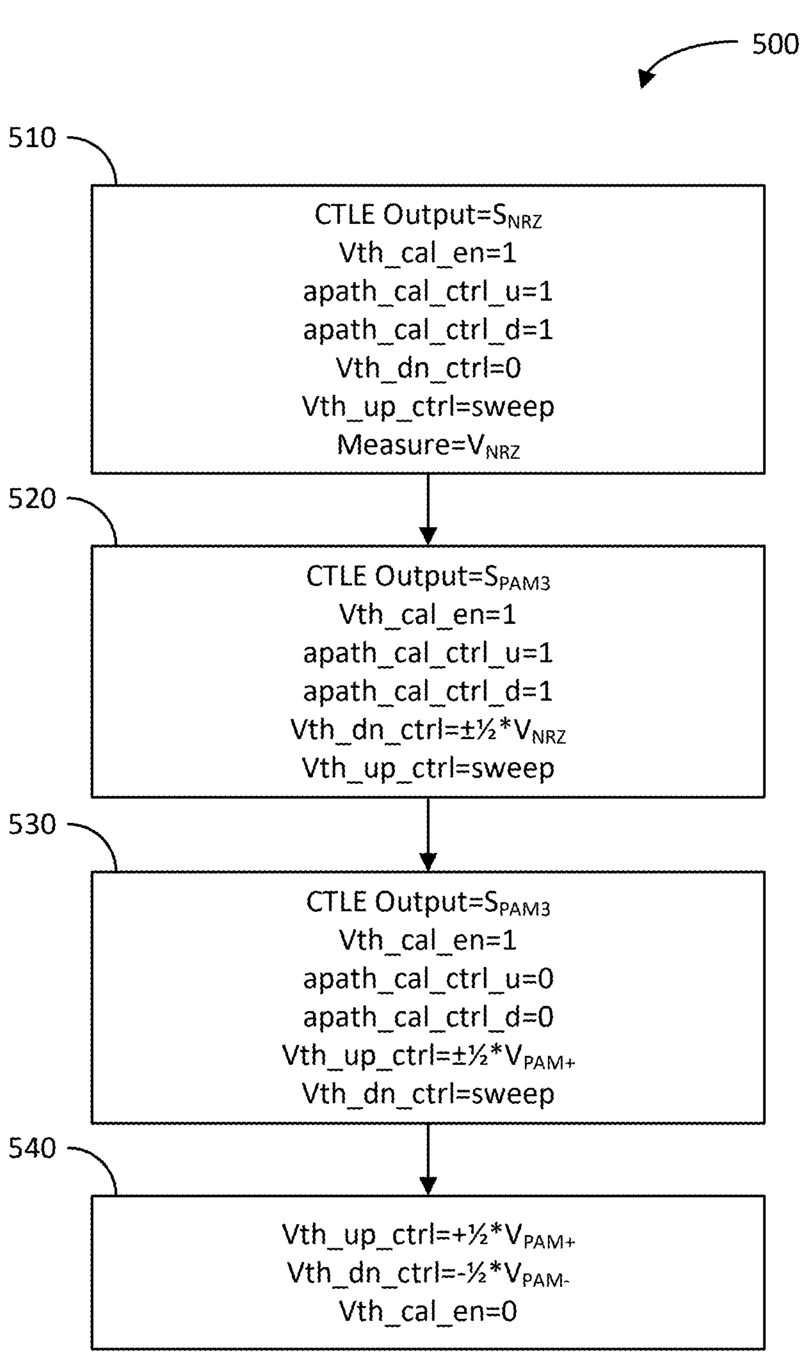
FIG. 5A illustrates a flow diagram of an example method of calibrating upper and lower thresholds implemented by the PAM3 slicer circuit and calibration PAM3 slicer circuit of the FIGS. 4A-4B in accordance with another aspect of the disclosure.

FIG. 5A illustrates a flow diagram of an example method 500 of calibrating the upper and lower thresholds Vth_up and Vth_dn of the PAM3 slicer circuit 400 in accordance with another aspect of the disclosure. In conjunction with FIG. 5A, FIG. 5B illustrates example signaling diagrams associated with the method 500 of calibrating the upper and lower thresholds Vth_up and Vth_dn in accordance with another aspect of the disclosure.

With reference to FIGS. 4A-4B and 5A-5B, the method 500 includes the calibration control circuit 470 setting: (1) the calibration signal select to NRZ so that the calibration signal source 430 generates a calibration NRZ signal $S_{NRZ}$; (2) the calibration enable signal Vth_cal_en to one (1) (asserted) to output the control signals apath_cal_ctrl_u and apath_cal_ctrl_d to the multiplexers 420 and 425, respectively; (3) the upper threshold calibration control signal apath_cal_ctrl_u to one (1) so that both the first multiplexer 420 and the calibration multiplexer 480 output the upper threshold voltage Vth_up; (4) the lower threshold calibration control signal apath_cal_ctrl_d to one (1) so that the second multiplexer 425 outputs the lower threshold voltage Vth_dn; (5) the lower threshold voltage control signal to Vth_dn_ctrl to zero (0) to set the lower threshold voltage Vth_dn to the value of zero (0); and (6) the upper threshold voltage control signal to Vth_dn_ctrl to sweep (block 510).

Figure 5B:
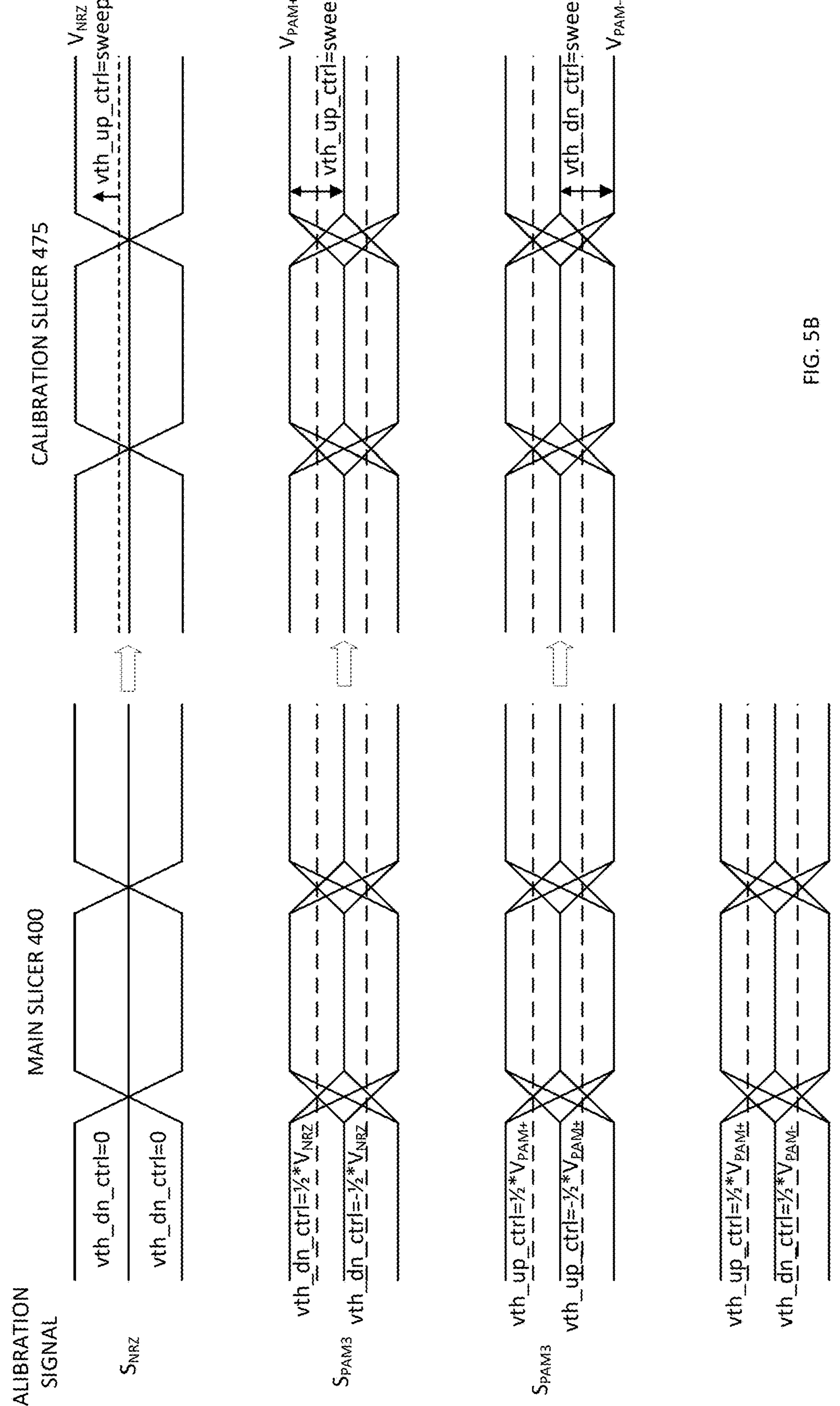
FIG. 5B illustrates example signaling diagrams associated with the method of calibrating the upper and lower thresholds of FIG. 5A in accordance with another aspect of the disclosure.

With particular reference to the top signal diagrams of FIG. 5B, the upper slicer 460 has its threshold voltage Vth_dn set to the zero (0) voltage level per the lower threshold voltage control signal Vth_dn_ctrl having a zero (0) value. The calibration PAM slicer 495 has its upper threshold voltage Vth_up sweeping per the upper threshold voltage control signal Vth_up_ctrl set to sweep. In particular, the upper threshold voltage Vth_up is swept from the 0-logic voltage level (same level as Vth_dn=0) towards the 1-logic voltage level. The NRZ signal with predefined data (e.g., alternating 1s and −1s, and/or other predefined data pattern) is provided to both the upper slicer 460 and the calibration PAM slicer 495. During the sweeping of the upper threshold voltage Vth_up, the calibration control circuit 470 then compares the data $D_U$ outputted by the upper slicer 460 with the calibration data $D_A$ outputted by the calibration PAM slicer 495. When the data $D_U$ no longer matches the calibration data $D_A$, it is assumed that the upper threshold voltage Vth_up has reached the top voltage level $V_{NRZ}$ of the NRZ signal.

The method 500 further includes the calibration control circuit 470 setting: (1) the calibration signal select to PAM3 so that the calibration signal source 430 generates a calibration PAM3 signal $S_{PAM3}$; (2) the calibration enable signal Vth_cal_en to one (1) (asserted) to output the control signals apath_cal_ctrl_u and apath_cal_ctrl_d to the multiplexers 420 and 425, respectively; (3) the upper threshold calibration control signal apath_cal_ctrl_u to one (1) so that both the first multiplexer 420 and the calibration multiplexer 480 output the lower threshold voltage Vth_dn; (4) the lower threshold calibration control signal apath_cal_ctrl_d to one (1) so that the second multiplexer 425 outputs the lower threshold voltage Vth_dn; (5) the lower threshold voltage control signal to Vth_dn_ctrl to a value corresponding to $\frac{1}{2}*V_{NRZ}$; and (6) the upper threshold voltage control signal Vth_up_ctrl to sweep between the 0-logic voltage level and the 1-logic voltage level (block 520).

With particular reference to the second from-the-top signal diagrams of FIG. 5B, the upper slicer 460 has its threshold voltage Vth_dn set to $\frac{1}{2}*V_{NRZ}$ per the lower threshold voltage control signal Vth_dn_ctrl. The calibration PAM slicer 495 has its upper threshold voltage Vth_up sweeping per the upper threshold voltage control signal Vth_up_ctrl set to sweep. In particular, the upper threshold voltage Vth_up is swept between the 0-logic level (same level as Vth_dn=0) and the 1-logic level. The PAM3 signal with predefined data (e.g., alternating 1s and 0s, and/or other predefined data pattern) is provided to both the upper slicer 460 and the calibration PAM slicer 495. During the sweeping of the upper threshold voltage Vth_up, the calibration control circuit 470 then compares the data $D_U$ outputted by the upper slicer 460 with the calibration data $D_A$ outputted by the calibration PAM slicer 495. When the data $D_U$ no longer matches the calibration data $D_A$, it is assumed that the threshold voltage Vth_up has reached the top voltage level $V_{PAM+}$ of the PAM3 signal.

The method 500 further includes the calibration control circuit 470 setting: (1) the calibration signal select to PAM3 so that the calibration signal source 430 generates the calibration PAM3 signal; (2) the calibration enable signal Vth_cal_en to one (1) (asserted) to output the control signals apath_cal_ctrl_u and apath_cal_ctrl_d to the multiplexers 420 and 425, respectively; (3) the upper threshold calibration control signal apath_cal_ctrl_u to zero (0) so that both the first multiplexer 420 and the calibration multiplexer 480 output the lower threshold voltage Vth_dn; (4) the lower threshold calibration control signal apath_cal_ctrl_d to zero (0) so that the second multiplexer 425 outputs the upper threshold voltage Vth_up; (5) the upper threshold voltage control signal Vth_up_ctrl to $-\frac{1}{2}*V_{PAM+}$ to set the upper threshold voltage Vth_up halfway between the 0-logic level and the −1-logic level; and (6) the lower threshold voltage control signal Vth_up_ctrl to sweep between the 0-logic level and the −1-logic level (block 530).

With particular reference to the third from-the-top signal diagrams of FIG. 5B, the lower slicer 460 has its threshold voltage Vth_up set to $-\frac{1}{2}*V_{PAM+}$ per the upper threshold voltage control signal Vth_up_ctrl. The calibration PAM slicer 495 has its threshold voltage Vth_dn sweeping per the lower threshold voltage control signal Vth_dn_ctrl set to sweep. In particular, the threshold voltage Vth_dn is swept between the 0-logic level and the −1-logic level. The PAM3 signal with predefined data (e.g., alternating 0s and −1s, and/or other predefined data pattern) is provided to both the lower slicer 465 and the calibration PAM slicer 495. During the sweeping of the lower threshold voltage Vth_dn, the calibration control circuit 470 then compares the data $D_D$ outputted by the lower slicer 465 with the calibration data $D_A$ outputted by the calibration PAM slicer 495. When the data $D_D$ no longer matches the calibration data $D_A$, it is assumed that the lower threshold voltage Vth_dn has reached the bottom voltage level $V_{PAM-}$ of the PAM3 signal.

The method 500 further includes the calibration control circuit 470 setting: (1) the upper threshold voltage control signal Vth_up_ctrl to $+\frac{1}{2}*V_{PAM+}$; (2) the lower threshold voltage control signal Vth_dn_ctrl to $-\frac{1}{2}*V_{PAM-}$; and (3) the calibration enable signal Vth_cal_en to zero (0) (deasserted) (block 540). Thus, the upper and lower threshold voltages Vth_up and Vth_dn are calibrated based on the measured levels of $V_{PAM+}$ and $V_{PAM-}$.

Although in this example, the order of the method 500 includes calibrating the upper threshold voltage Vth_up per blocks 510 and 520, and then proceeding to calibrating the lower threshold voltage Vth_dn per block 530, it shall be understood that the method 500 could alternatively be done by calibrating the lower threshold voltage Vth_dn per blocks 510 and 520, and then proceeding to calibrating the upper threshold voltage Vth_dn per block 530. Further, as discussed further herein, the method 500 may be applicable to PAM signals that have more than two (2) eyes, such as PAM4, PAM5, or higher.

Figure 6:
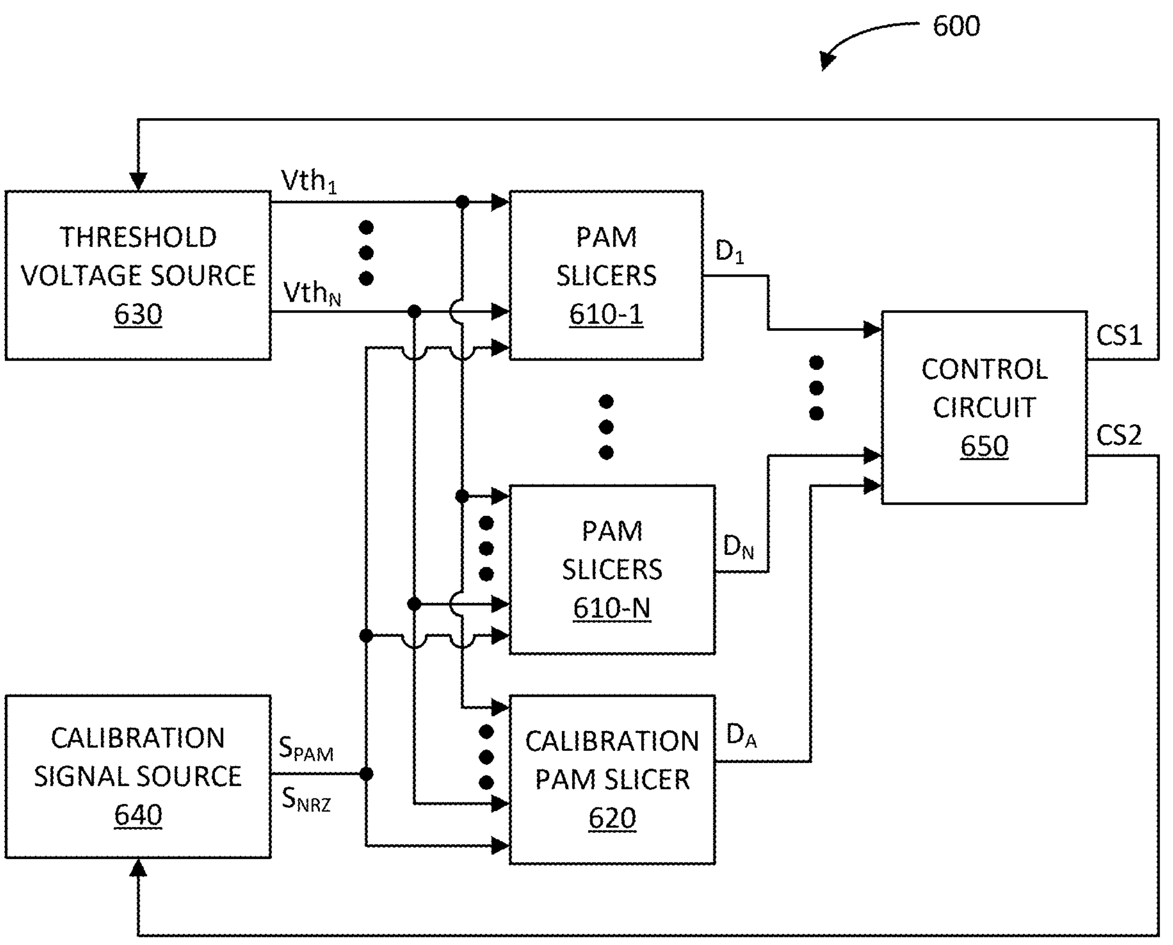
FIG. 6 illustrates a block diagram of an example pulse modulation amplitude (PAM) slicer circuit in accordance with another aspect of the disclosure.

FIG. 6 illustrates a block diagram of an example apparatus (e.g., PAM slicer circuit) 600 in accordance with another aspect of the disclosure. The apparatus 600 includes a set of N pulse amplitude modulation (PAM) slicers 610-1 to 610-N, wherein N is an integer. The apparatus 600 further includes a calibration PAM slicer 620. Additionally, the apparatus 600 includes a threshold voltage source 630 coupled to the set of N PAM slicers 610-1 to 610-N and the calibration PAM slicer 620 (e.g., to provide a set of threshold voltages $Vth_1$ to $Vth_N$ thereto). The apparatus 600 also includes a calibration signal source 640 coupled to the set of N PAM slicers 610-1 to 610-N and the calibration PAM slicer 620 (e.g., to provide a PAM signal $S_{PAM}$ and an NRZ signal $S_{NRZ}$ thereto).

Further the apparatus 600 includes a calibration control circuit 650 coupled to the set of N PAM slicers (e.g., to receive a set of data $D_1$ to $D_N$ respectively therefrom), the calibration PAM slicer 620 (e.g., to receive a data $D_A$ therefrom), the threshold voltage source 630 (e.g., to provide a first control signal (CS1) thereto), and the calibration signal source 640 (e.g., to provide a second control signal (CS2) thereto).

Figure 7:
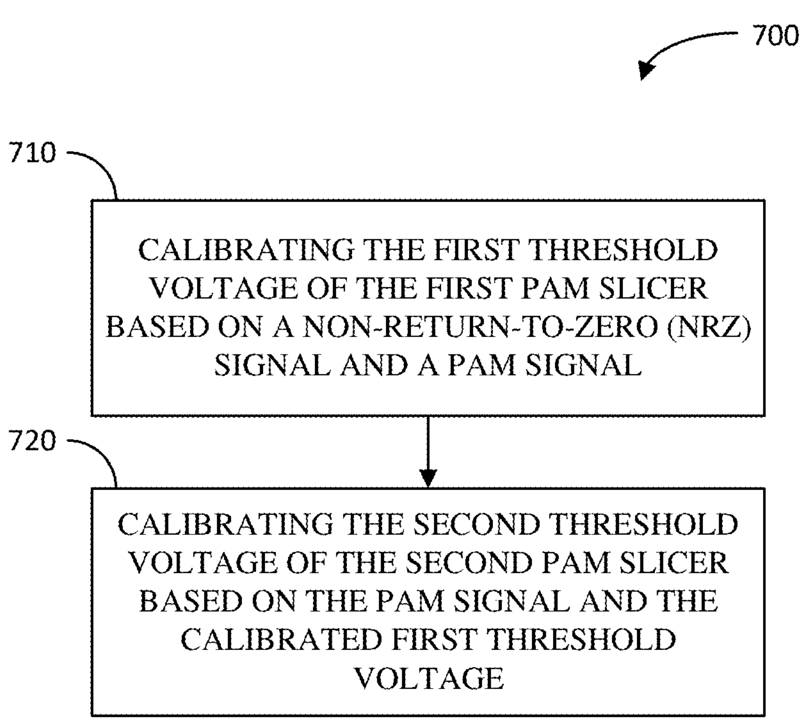
FIG. 7 illustrates a flow diagram of an example method of calibrating threshold voltages of PAM slicers in accordance with another aspect of the disclosure.

FIG. 7 illustrates a flow diagram of an example method 700 calibrating a first threshold voltage of a first pulse amplitude modulation (PAM) slicer and a second threshold voltage of a second PAM slicer. The method 700 includes calibrating the first threshold voltage of the first PAM slicer based on a non-return-to-zero (NRZ) signal and a PAM signal (block 710). The method 700 further includes calibrating the second threshold voltage of the second PAM slicer based on the PAM signal and the calibrated first threshold voltage (block 720).

The following provides an overview of aspects of the present disclosure:

Aspect 1: An apparatus, comprising: a set of N pulse amplitude modulation (PAM) slicers, wherein N is an integer; a calibration PAM slicer; a threshold voltage source coupled to the set of N PAM slicers and the calibration PAM slicer; a calibration signal source coupled to the set of N PAM slicers and the calibration PAM slicer; and a calibration control circuit coupled to the set of N PAM slicers, the calibration PAM slicer, the threshold voltage source, and the calibration signal source.

Aspect 2: The apparatus of aspect 1, wherein the calibration signal source is configured to generate a PAM signal and a non-return-to-zero (NRZ) signal.

Aspect 3: The apparatus of aspect 2, wherein the threshold voltage source is configured to generate a set of N threshold voltages.

Aspect 4: The apparatus of aspect 3, wherein: the set of N PAM slicers are configured to generate a first set of data based on the PAM signal and the NRZ signal; and the calibration PAM slicer is configured to generate a second set of data based on the PAM signal and the NRZ signal.

Aspect 5: The apparatus of aspect 4, wherein the calibration control circuit is configured to: compare the first set of data with the second set of data; and adjust a set of N threshold voltages generated by the threshold voltage source based on the comparison of the first set of data with the second set of data.

Aspect 6: The apparatus of any one of aspect 1-5, wherein the calibration control circuit is configured to produce a first calibrated threshold voltage of a first PAM slicer of the set of N PAM slicers including: controlling the calibration signal source to provide an NRZ signal to the first PAM slicer and the calibration PAM slicer; providing a first control signal set to a first value to the threshold voltage source to provide a first fixed threshold voltage to the first PAM slicer; providing a second control signal to the threshold voltage source to provide a first sweeping threshold voltage to the calibration PAM slicer; comparing data generated by the first PAM slicer with data generated by the calibration PAM slicer, wherein the data generated by the first PAM slicer is based on the NRZ signal and the first fixed threshold voltage, and wherein the data generated by the calibration PAM slicer is based on the NRZ signal and the first sweeping threshold voltage; and setting the first control signal to a second value based on the comparison of the data generated by the first PAM slicer with the data generated by the calibration PAM slicer.

Aspect 7: The apparatus of aspect 6, wherein the second value is based on a value of the second control signal when the data generated by the first PAM slicer no longer matches the data generated by the calibration PAM slicer during a sweeping of the first sweeping threshold voltage.

Aspect 8: The apparatus of aspect 6 or 7, wherein the first value of the first control signal corresponds to a logic zero voltage level of the NRZ signal.

Aspect 9: The apparatus of any one of aspects 6-8, wherein the calibration control circuit is further configured to produce the first calibrated threshold voltage of the first PAM slicer including: controlling the calibration signal source to provide a PAM signal to the first PAM slicer and the calibration PAM slicer; providing the first control signal set to the second value to the threshold voltage source to provide a second fixed threshold voltage to the first PAM slicer; providing the second control signal to the threshold voltage source to provide a second sweeping threshold voltage to the calibration PAM slicer; comparing data generated by the first PAM slicer with data generated by the calibration PAM slicer, wherein the data generated by the first PAM slicer is based on the PAM signal and the second fixed threshold voltage, and wherein the data generated by the calibration PAM slicer is based on the PAM signal and the second sweeping threshold voltage; setting the second control signal to a third value based on the comparison of the data generated by the first PAM slicer with the data generated by the calibration PAM slicer; and providing the second control signal set to the third value to the threshold voltage source to produce the first calibrated threshold voltage of the first PAM slicer.

Aspect 10: The apparatus of aspect 9, wherein the third value is based on a value of the second control signal when the data generated by the first PAM slicer no longer matches the data generated by the calibration PAM slicer during a sweeping of the second sweeping threshold voltage.

Aspect 11: The apparatus of aspect 10, wherein the calibration control circuit is further configured to produce a second calibrated threshold voltage of a second PAM slicer of the set of N PAM slicers including: controlling the calibration signal source to provide the PAM signal to the second PAM slicer and the calibration PAM slicer; providing the second control signal set to the third value to the threshold voltage source to provide a third fixed threshold voltage to the second PAM slicer; providing the first control signal to the threshold voltage source to provide a third sweeping threshold voltage to the calibration PAM slicer; comparing data generated by the second PAM slicer with data generated by the calibration PAM slicer, wherein the data generated by the second PAM slicer is based on the PAM signal and the third fixed threshold voltage, and wherein the data generated by the calibration PAM slicer is based on the PAM signal and the third sweeping threshold voltage; setting the first control signal to a fourth value based on the comparison of the data generated by the second PAM slicer with the data generated by the calibration PAM slicer; and providing the first control signal set to the fourth value to the threshold voltage source to produce the second calibrated threshold voltage of the second PAM slicer.

Aspect 12: The apparatus of aspect 11, wherein the fourth value is based on a value of the first control signal when the data generated by the second PAM slicer no longer matches the data generated by the calibration PAM slicer during a sweeping of the third sweeping threshold voltage.

Aspect 13: A method of calibrating a first threshold voltage of a first pulse amplitude modulation (PAM) slicer and a second threshold voltage of a second PAM slicer, comprising: calibrating the first threshold voltage of the first PAM slicer based on a non-return-to-zero (NRZ) signal and a PAM signal; and calibrating the second threshold voltage of the second PAM slicer based on the PAM signal and the calibrated first threshold voltage.

Aspect 14: The method of aspect 13, wherein calibrating the first threshold voltage of the first PAM slicer, comprises: providing a non-return-to-zero (NRZ) signal to the first PAM slicer and a calibration PAM slicer; providing a first fixed threshold voltage to the first PAM slicer; providing a first sweeping threshold voltage to the calibration PAM slicer; comparing data generated by the first PAM slicer with data generated by the calibration PAM slicer, wherein the data generated by the first PAM slicer is based on the NRZ signal and the first fixed threshold voltage, and wherein the data generated by the calibration PAM slicer is based on the NRZ signal and the first sweeping threshold voltage; and providing a second fixed threshold voltage to the first PAM slicer based on the comparison of the data generated by the first PAM slicer with the data generated by the calibration PAM slicer.

Aspect 15: The method of aspect 14, wherein the second fixed threshold voltage is based on the first sweeping threshold voltage when the data generated by the first PAM slicer no longer matches the data generated by the calibration PAM slicer during a sweeping of the first sweeping threshold voltage.

Aspect 16: The method of aspect 14 or 15, wherein the first fixed threshold voltage corresponds to a logic zero voltage level of the NRZ signal.

Aspect 17: The method of any one of aspects 14-16, further comprising: providing a PAM signal to the first PAM slicer and the calibration PAM slicer; providing a second sweeping threshold voltage to the calibration PAM slicer; comparing data generated by the first PAM slicer with data generated by the calibration PAM slicer, wherein the data generated by the first PAM slicer is based on the PAM signal and the second fixed threshold voltage, and wherein the data generated by the calibration PAM slicer is based on the PAM signal and the second sweeping threshold voltage; and setting the first threshold voltage of the first PAM slicer based on the comparison of the data generated by the first PAM slicer with the data generated by the calibration PAM slicer.

Aspect 18: The method of aspect 17, wherein the first threshold voltage is based on the second sweeping threshold voltage when the data generated by the first PAM slicer no longer matches the data generated by the calibration PAM slicer during a sweeping of the second sweeping threshold voltage.

Aspect 19: The method of aspect 17 or 18, wherein calibrating the second threshold voltage of the second PAM slicer, comprises: providing the PAM signal to the second PAM slicer and the calibration PAM slicer; providing the first threshold voltage to the second PAM slicer; providing a third sweeping threshold voltage to the calibration PAM slicer; comparing data generated by the second PAM slicer with data generated by the calibration PAM slicer, wherein the data generated by the second PAM slicer is based on the PAM signal and the first threshold voltage, and wherein the data generated by the calibration PAM slicer is based on the PAM signal and the third sweeping threshold voltage; and setting the second threshold voltage of the second PAM slicer based on the comparison of the data generated by the first PAM slicer with the data generated by the calibration PAM slicer.

Aspect 20: The method of claim 19, wherein setting the second threshold voltage is based on the third sweeping threshold voltage when the data generated by the second PAM slicer no longer matches from the data generated by the calibration PAM slicer during a sweeping of the third sweeping threshold voltage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

a set of N pulse amplitude modulation (PAM) slicers, wherein N is an integer;

a calibration PAM slicer;

a threshold voltage source coupled to the set of N PAM slicers and the calibration PAM slicer;

a calibration signal source coupled to the set of N PAM slicers and the calibration PAM slicer; and a calibration control circuit coupled to the set of N PAM slicers, the calibration PAM slicer, the threshold voltage source, and the calibration signal source, wherein the calibration signal source is controlled by the calibration control circuit.

2. The apparatus of claim 1, wherein the calibration signal source is configured to generate a PAM signal and a non-return-to-zero (NRZ) signal.

3. The apparatus of claim 2, wherein the threshold voltage source is configured to generate a set of N threshold voltages.

4. The apparatus of claim 3, wherein:

the set of N PAM slicers are configured to generate a first set of data based on the PAM signal and the NRZ signal; and the calibration PAM slicer is configured to generate a second set of data based on the PAM signal and the NRZ signal.

5. The apparatus of claim 4, wherein the calibration control circuit is configured to:

compare the first set of data with the second set of data; and adjust a set of N threshold voltages generated by the threshold voltage source based on the comparison of the first set of data with the second set of data.

6. The apparatus of claim 1, wherein the calibration control circuit is configured to produce a first calibrated threshold voltage of a first PAM slicer of the set of N PAM slicers including:

controlling the calibration signal source to provide an NRZ signal to the first PAM slicer and the calibration PAM slicer;

providing a first control signal set to a first value to the threshold voltage source to provide a first fixed threshold voltage to the first PAM slicer;

providing a second control signal to the threshold voltage source to provide a first sweeping threshold voltage to the calibration PAM slicer;

comparing data generated by the first PAM slicer with data generated by the calibration PAM slicer, wherein the data generated by the first PAM slicer is based on the NRZ signal and the first fixed threshold voltage, and wherein the data generated by the calibration PAM slicer is based on the NRZ signal and the first sweeping threshold voltage; and setting the first control signal to a second value based on the comparison of the data generated by the first PAM slicer with the data generated by the calibration PAM slicer.

7. The apparatus of claim 6, wherein the second value is based on a value of the second control signal when the data generated by the first PAM slicer no longer matches the data generated by the calibration PAM slicer during a sweeping of the first sweeping threshold voltage.

8. The apparatus of claim 6, wherein the first value of the first control signal corresponds to a logic zero voltage level of the NRZ signal.

9. The apparatus of claim 6, wherein the calibration control circuit is further configured to produce the first calibrated threshold voltage of the first PAM slicer including:

controlling the calibration signal source to provide a PAM signal to the first PAM slicer and the calibration PAM slicer;

providing the first control signal set to the second value to the threshold voltage source to provide a second fixed threshold voltage to the first PAM slicer;

providing the second control signal to the threshold voltage source to provide a second sweeping threshold voltage to the calibration PAM slicer;

comparing data generated by the first PAM slicer with data generated by the calibration PAM slicer, wherein the data generated by the first PAM slicer is based on the PAM signal and the second fixed threshold voltage, and wherein the data generated by the calibration PAM slicer is based on the PAM signal and the second sweeping threshold voltage;

setting the second control signal to a third value based on the comparison of the data generated by the first PAM slicer with the data generated by the calibration PAM slicer; and providing the second control signal set to the third value to the threshold voltage source to produce the first calibrated threshold voltage of the first PAM slicer.

10. The apparatus of claim 9, wherein the third value is based on a value of the second control signal when the data generated by the first PAM slicer no longer matches the data generated by the calibration PAM slicer during a sweeping of the second sweeping threshold voltage.

11. The apparatus of claim 9, wherein the calibration control circuit is further configured to produce a second calibrated threshold voltage of a second PAM slicer of the set of N PAM slicers including:

controlling the calibration signal source to provide the PAM signal to the second PAM slicer and the calibration PAM slicer;

providing the second control signal set to the third value to the threshold voltage source to provide a third fixed threshold voltage to the second PAM slicer;

providing the first control signal to the threshold voltage source to provide a third sweeping threshold voltage to the calibration PAM slicer;

comparing data generated by the second PAM slicer with data generated by the calibration PAM slicer, wherein the data generated by the second PAM slicer is based on the PAM signal and the third fixed threshold voltage, and wherein the data generated by the calibration PAM slicer is based on the PAM signal and the third sweeping threshold voltage;

setting the first control signal to a fourth value based on the comparison of the data generated by the second PAM slicer with the data generated by the calibration PAM slicer; and providing the first control signal set to the fourth value to the threshold voltage source to produce the second calibrated threshold voltage of the second PAM slicer.

12. The apparatus of claim 11, wherein the fourth value is based on a value of the first control signal when the data generated by the second PAM slicer no longer matches the data generated by the calibration PAM slicer during a sweeping of the third sweeping threshold voltage.

13. A method of calibrating a first threshold voltage of a first pulse amplitude modulation (PAM) slicer and a second threshold voltage of a second PAM slicer, comprising:

calibrating the first threshold voltage of the first PAM slicer based on a non-return-to-zero (NRZ) signal and a PAM signal; and calibrating the second threshold voltage of the second PAM slicer based on the PAM signal and the calibrated first threshold voltage.

14. The method of claim 13, wherein calibrating the first threshold voltage of the first PAM slicer, comprises:

providing NRZ signal to the first PAM slicer and a calibration PAM slicer;

providing a first fixed threshold voltage to the first PAM slicer;

providing a first sweeping threshold voltage to the calibration PAM slicer;

comparing data generated by the first PAM slicer with data generated by the calibration PAM slicer, wherein the data generated by the first PAM slicer is based on the NRZ signal and the first fixed threshold voltage, and wherein the data generated by the calibration PAM slicer is based on the NRZ signal and the first sweeping threshold voltage; and providing a second fixed threshold voltage to the first PAM slicer based on the comparison of the data generated by the first PAM slicer with the data generated by the calibration PAM slicer.

15. The method of claim 14, wherein the second fixed threshold voltage is based on the first sweeping threshold voltage when the data generated by the first PAM slicer no longer matches the data generated by the calibration PAM slicer during a sweeping of the first sweeping threshold voltage.

16. The method of claim 14, wherein the first fixed threshold voltage corresponds to a logic zero voltage level of the NRZ signal.

17. The method of claim 14, further comprising:

providing a PAM signal to the first PAM slicer and the calibration PAM slicer;

providing a second sweeping threshold voltage to the calibration PAM slicer;

comparing data generated by the first PAM slicer with data generated by the calibration PAM slicer, wherein the data generated by the first PAM slicer is based on the PAM signal and the second fixed threshold voltage, and wherein the data generated by the calibration PAM slicer is based on the PAM signal and the second sweeping threshold voltage; and setting the first threshold voltage of the first PAM slicer based on the comparison of the data generated by the first PAM slicer with the data generated by the calibration PAM slicer.

18. The method of claim 17, wherein the first threshold voltage is based on the second sweeping threshold voltage when the data generated by the first PAM slicer no longer matches the data generated by the calibration PAM slicer during a sweeping of the second sweeping threshold voltage.

19. The method of claim 17, wherein calibrating the second threshold voltage of the second PAM slicer, comprises:

providing the PAM signal to the second PAM slicer and the calibration PAM slicer;

providing the first threshold voltage to the second PAM slicer;

providing a third sweeping threshold voltage to the calibration PAM slicer;

comparing data generated by the second PAM slicer with data generated by the calibration PAM slicer, wherein the data generated by the second PAM slicer is based on the PAM signal and the first threshold voltage, and wherein the data generated by the calibration PAM slicer is based on the PAM signal and the third sweeping threshold voltage; and setting the second threshold voltage of the second PAM slicer based on the comparison of the data generated by the first PAM slicer with the data generated by the calibration PAM slicer.

20. The method of claim 19, wherein setting the second threshold voltage is based on the third sweeping threshold voltage when the data generated by the second PAM slicer no longer matches the data generated by the calibration PAM slicer during a sweeping of the third sweeping threshold voltage.

* * * * *